(12) United States Patent
Morisada et al.

(10) Patent No.: US 8,878,915 B2
(45) Date of Patent: Nov. 4, 2014

(54) IMAGE PROCESSING DEVICE AND IMAGE PROCESSING METHOD

(75) Inventors: Hidehiko Morisada, Tokyo (JP); Takayuki Shinohara, Tokyo (JP); Hiromasa Ohkubo, Kanagawa (JP)

(73) Assignees: Sony Corporation, Tokyo (JP); Sony Computer Entertainment, Inc., Tokyo (JP)

( * ) Notice: Subject to any disclaimer, the term of this patent is extended or adjusted under 35 U.S.C. 154(b) by 632 days.

(21) Appl. No.: 13/154,716

(22) Filed: Jun. 7, 2011

(65) Prior Publication Data

US 2012/0007964 A1    Jan. 12, 2012

(30) Foreign Application Priority Data

Jul. 7, 2010 (JP) ................................ 2010-155276

(51) Int. Cl.
*H04N 13/04* (2006.01)
*H04N 9/47* (2006.01)
*G06T 7/00* (2006.01)
*H04N 13/00* (2006.01)

(52) U.S. Cl.
CPC .......... *H04N 13/0022* (2013.01); *G06T 7/0022* (2013.01); *H04N 13/0497* (2013.01)
USPC ......................................................... 348/54

(58) Field of Classification Search
CPC ........... H04N 13/0497; H04N 13/0296; G06T 7/0022
USPC ......................................................... 348/54
See application file for complete search history.

(56) References Cited

U.S. PATENT DOCUMENTS

2005/0129325 A1* 6/2005 Wu ............................... 382/254
2006/0114320 A1* 6/2006 Nagaoka et al. .............. 348/118
2008/0240549 A1* 10/2008 Koo et al. ..................... 382/154

FOREIGN PATENT DOCUMENTS

| JP | 2002-247604 | 8/2002 |
| JP | 2004-349736 | 12/2004 |
| JP | 2005-266293 | 9/2005 |

OTHER PUBLICATIONS

Notification of Reason(s) for Refusal dated Apr. 17, 2012, from corresponding Japanese Application No. 2010-155276.

* cited by examiner

*Primary Examiner* — Andy Rao
*Assistant Examiner* — Jared Walker
(74) *Attorney, Agent, or Firm* — Katten Muchin Rosenman LLP

(57) ABSTRACT

A location error determination unit determines, prior to displaying on a display device stereoscopic images including a parallax image for the left eye and a parallax image for the right eye of a subject, whether the parallax image for the left eye and the parallax image for the right eye are stereoscopic images that can be located as three-dimensional images. An error communicating unit communicates an error when it is determined that that the parallax image for the left eye and the parallax image for the right eye cannot be located as stereoscopic images or when it is determined that the range of parallax between the parallax image for the left eye and the parallax image for the right eye is not accommodated within the predetermined parallax range.

5 Claims, 9 Drawing Sheets

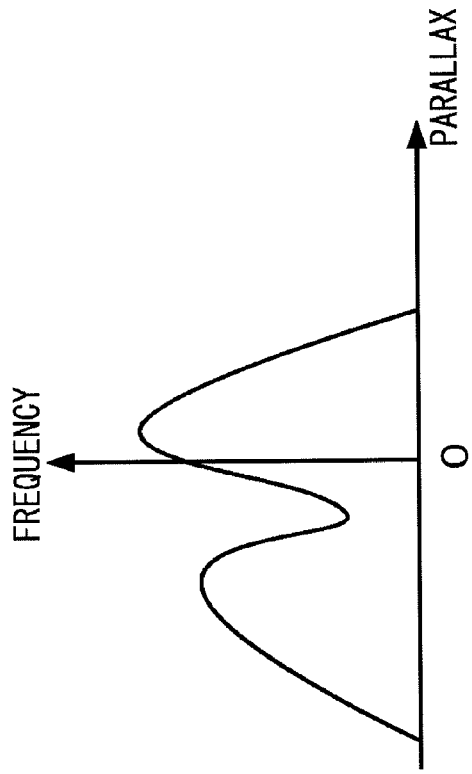
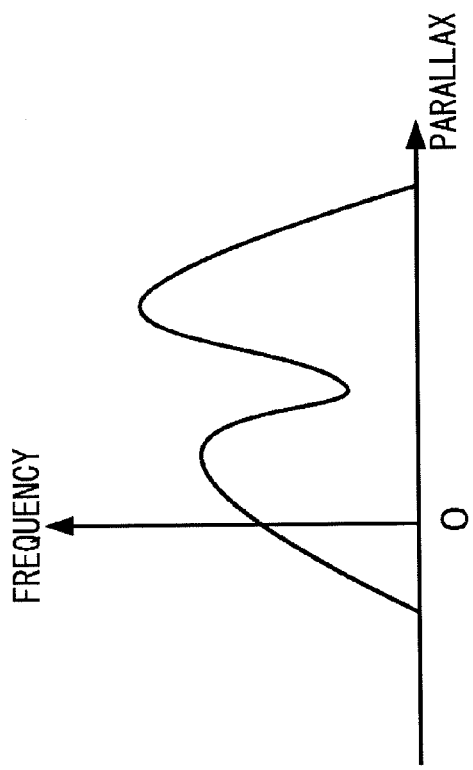

IMAGE PROCESSING DEVICE AND IMAGE PROCESSING METHOD

BACKGROUND OF THE INVENTION

1. Field of the Invention

The present invention relates to image processing devices and image processing methods.

2. Description of the Related Art

Imaging devices capable of generating stereoscopic images including a parallax image for the left eye and a parallax image for the right eye of a subject are becoming available to the public. Imaging devices like this may be implemented by, for example, multi-lens cameras having two or more optical systems for imaging. Alternatively, parallax images may be generated by subjecting an image captured from a plurality of viewpoints using a single-lens camera to image processing.

Meanwhile, display devices capable of presenting images with depth to a user by presenting a parallax image for the left eye included in stereoscopic images to the user's left eye and presenting a parallax image for the right eye to the user's right eye are becoming available to the public. In particular, consumer three-dimensional television sets that use shutter glasses are becoming rapidly available to the public. Chances of viewing stereoscopic images taken by ordinary user in a living room have increased.

In viewing stereoscopic images including a parallax image for the left eye and a parallax image for the right eye on a display device, the user tries to locate the stereoscopic images in the brain using the adjustment function of eye balls. If the images displayed on the display device are not suitable as stereoscopic images, the user may experience heavy load associated with adjustment. Considering the fact that imaging devices capable of generating stereoscopic images are becoming available to users not experienced with capturing stereoscopic images, images not suitable as stereoscopic images may be generated in an increasing number of cases.

SUMMARY OF THE INVENTION

The present invention addresses the issue and a purpose thereof is to provide a technology of reducing user load associated with viewing stereoscopic images.

One embodiment of the present invention that addresses the issue relates to an image processing device. The device comprises: a location error determination unit configured to determine, prior to displaying on a display device stereoscopic images including a parallax image for the left eye and a parallax image for the right eye of a subject, whether the parallax image for the left eye and the parallax image for the right eye are stereoscopic images that can be located as three-dimensional images; a parallax error determination unit configured to determine, when it is determined that the parallax image for the left eye and the parallax image for the right eye can be located as stereoscopic images, whether a range of distribution of parallax between the parallax image for the left eye and the parallax image for the right eye is accommodated within a predetermined parallax range; and an error communicating unit configured to communicate an error when it is determined that that the parallax image for the left eye and the parallax image for the right eye cannot be located as stereoscopic images or when it is determined that the range of parallax between the parallax image for the left eye and the parallax image for the right eye is not accommodated within the predetermined parallax range.

Another embodiment of the present invention that addresses the issue also relates to an image processing device. An image processing device comprising: a maximum parallax range acquisition unit configured to acquire, prior to displaying on a display device stereoscopic images including a parallax image for the left eye and a parallax image for the right eye of a subject, the maximum parallax range displayed on the display device by referring to a size of the display device; and a parallax range control unit configured to adjust parallax between the parallax image for the left eye and the parallax image for the right eye so that the distribution of parallax between the parallax image for the left eye and the parallax image for the right eye does not exceed the maximum parallax range.

Another embodiment of the present invention relates to an image processing method. The method comprises: using a processor to determine, prior to displaying on a display device stereoscopic images including a parallax image for the left eye and a parallax image for the right eye of a subject, whether the parallax image for the left eye and the parallax image for the right eye are stereoscopic images that can be located as three-dimensional images; using the processor to determine, when it is determined that the parallax image for the left eye and the parallax image for the right eye can be located as stereoscopic images, whether a range of distribution of parallax between the parallax image for the left eye and the parallax image for the right eye is accommodated within a predetermined parallax range; and using a processor to communicate an error when it is determined that that the parallax image for the left eye and the parallax image for the right eye cannot be located as stereoscopic images or when it is determined that the range of parallax between the parallax image for the left eye and the parallax image for the right eye is not accommodated within the predetermined parallax range.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A and 5B schematically shows an example of parallax distribution;

DETAILED DESCRIPTION OF THE INVENTION

The invention will now be described by reference to the preferred embodiments. This does not intend to limit the scope of the present invention, but to exemplify the invention.

A summary of the embodiment will be described. Prior to displaying stereoscopic images on a display device, an image processing device 100 according to the embodiment examines the distribution of parallax in a parallax image for the left eye and a parallax image for the right eye included in the stereoscopic images. The device 100 examines whether the images are suitable as stereoscopic images and displays the result on the display device.

Figure 1:
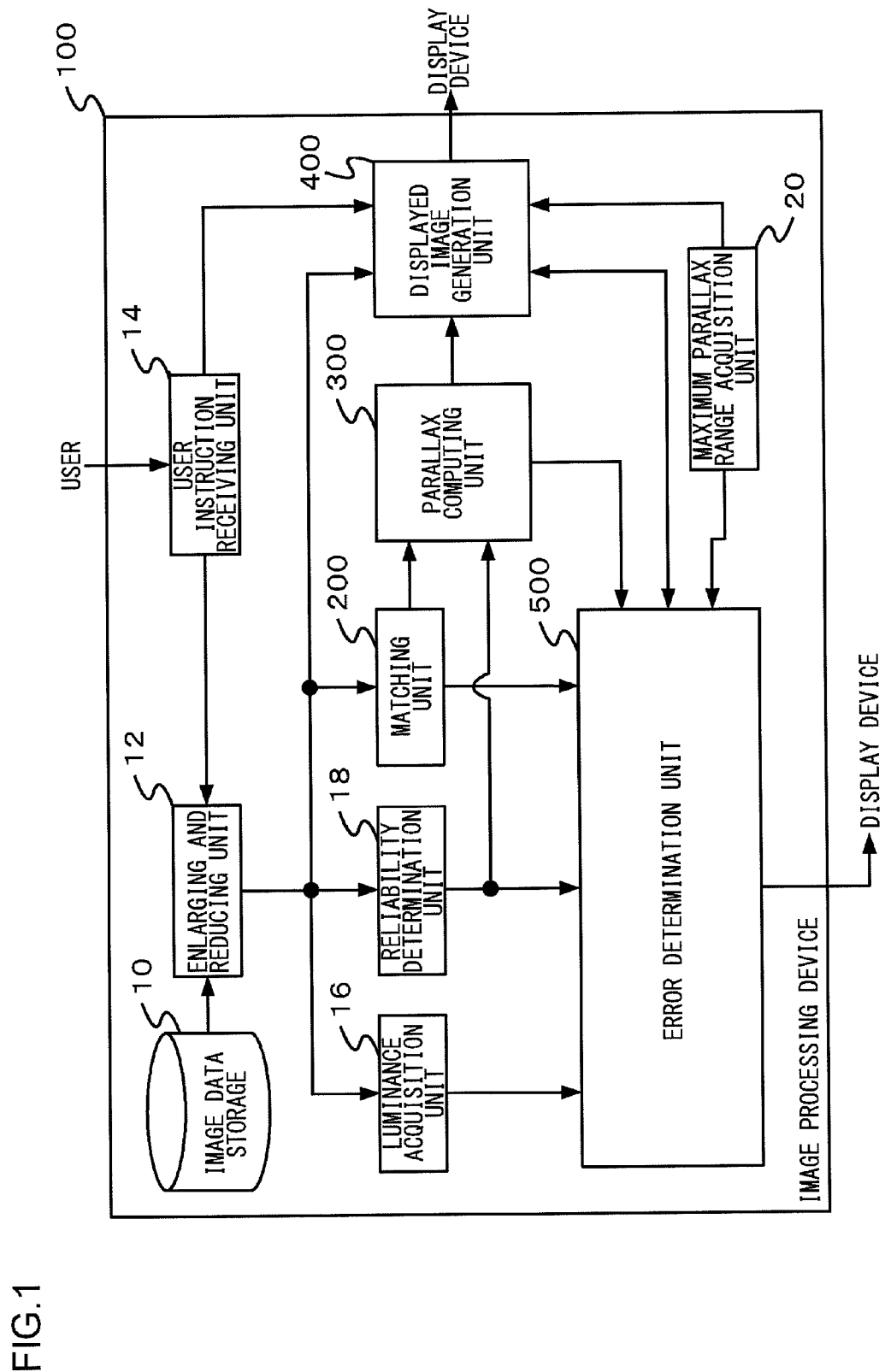
FIG. 1 schematically shows the internal configuration of the image processing device 100 according to the embodiment.

FIG. 1 schematically shows the internal configuration of the image processing device 100 according to the embodiment. The image processing device 100 according to the embodiment comprises an image data storage 10, an enlarging and reducing unit 12, a user request receiving unit 14, a luminance acquisition unit 16, a reliability determination unit 18, a maximum parallax range acquisition unit 20, a matching unit 200, a parallax computing unit 300, a displayed image generation unit 400, and an error determination unit 500.

The image data storage 10 stores stereoscopic images including a parallax image for the left eye and a parallax image for the right eye. For example, the storage 10 may be a known large-capacity storage device such as a hard disk drive (HDD) or a solid state drive (SSD). The user request receiving unit 14 receives a user request on the image processing device 100 via a user interface such as a keyboard, mouse, or a controller (not shown).

Upon receiving a user request indicating that the stereoscopic images as displayed should be enlarged or reduced via the user request receiving unit 14, the enlarging and reducing unit 12 acquires the stereoscopic images that should be displayed from the image data storage unit 10 and enlarges or reduces the parallax image for the left eye and the parallax image for the right eye included in the stereoscopic images. When the stereoscopic images exceed the maximum size that can be displayed on the display device as a result of enlarging the images, the enlarging and reducing unit 12 trims the images so that the images are of a size that can be displayed on the display device. Absent any specific request from the user to enlarge or reduce the images, the enlarging and reducing unit 12 directly outputs the images acquired from the image data storage 10 to the luminance acquisition unit 16, the reliability determination unit 18, the matching unit 200, and the displayed image generation unit 400.

The reliability determination unit 18 acquires the parallax image for the left eye and the parallax image for the right eye from the enlarging and reducing unit 12 and computes "reliability of matching (reliability of matching score computation)" and "edge distribution" for both images. "Reliability of matching" is an indicator indicating the sharpness of image edges constituting an imaged subject and represents the ratio of image areas that include spatial frequency components of a predefined value or higher with respect to the entirety of the image. Images with less matching reliability are considered to contain less high frequency components and fewer edges in the image. In parallax images like this, it is generally difficult to compute reliable a matching score between the images, although the difficulty varies depending on the method of matching. Matching between parallax images will be discussed in further detail later. The "predefined value" is determined through experiments depending on the method of matching. The reliability determination unit 18 also identifies, by computation, an image area in which reliable matching is established as "edge distribution".

The matching unit 200 acquires the parallax image for the left eye and the parallax image for the right eye from the enlarging and reducing unit 12 and examines correspondence between subjects captured in both parallax images. Details of the matching unit 200 will be given later. The parallax computing unit 300 computes the distribution of parallax included in the parallax images in accordance with the reliability of matching between the parallax images acquired from the reliability determination unit 18 and the correspondence acquired from the matching unit 200. Details of the parallax computing unit 300 will be given later.

The displayed image generation unit 400 generates parallax images that should actually be displayed on the display device in accordance with the parallax images acquired from the enlarging and reducing unit 12. Details of the displayed image generation unit 400 will be given later.

The maximum parallax range acquisition unit 20 computes the maximum parallax range that should be displayed on the display device in accordance with the size of the display device (hereinafter, simply referred to as "maximum parallax range") and acquires the computed range. Since human eyes are spaced apart by about 6 cm, parallax is produced between an image viewed from the left eye and an image viewed from the right eye. Human brain is said to recognize the depth of an object using parallax images perceived by the left and right eyes. For this reason, by projecting a parallax image perceived by the left eye and a parallax image perceived by the right eye to the respective eyes, an image having a depth is perceived by one.

For example, if the parallax image for the left eye and the parallax image for the right eye are identical, parallax induced by the subject and included in the images is completely 0. As the user views such images on a display device such as a three-dimensional television set, the user perceives that all subjects are located on the television screen.

If the parallax image for the left eye and the parallax image for the right eye include any subject with parallax, displacement occurs between the horizontal coordinates of pixels forming the subject in the parallax image for the left eye and the horizontal coordinates of pixels forming the subject in the parallax image for the right eye. If the displacement is 6 cm or more, which is the distance between human eyes, when the subject is displayed on the display device, the user finds it difficult to locate stereoscopic image by adjusting the eyes, feeling severely loaded. The number of pixels that defines the displacement between the parallax images displayed and that causes the displacement of 6 cm in the display device varies depending on, for example, the size of the display device.

In this respect, the maximum parallax range acquisition unit 20 refers to the size of the display device and computes the maximum parallax range such that the range of parallax that should be displayed on the display device is within the range of parallax in which ordinary users can make adjustment. The unit 20 then acquires the computed range.

The luminance acquisition unit 16 acquires the parallax image for the left eye and the parallax image for the right eye from the enlarging and reducing unit 12 and generates luminance value distribution of the pixels forming the images. The error determination unit 500 examines whether the stereoscopic images that should be displayed on the display device are suitable as stereoscopic images and displays the result of determination on the display device. Details of the error determination unit 500 will be given later.

FIG. 1 shows the functional components to implement the image processing device 100 according to the embodiment so that the other components are omitted from the illustration. The elements depicted in FIG. 1. as functional blocks for performing various processes are implemented by hardware such as a central processing unit (CPU), main memory, or other large scale integration (LSI), and by software such as a programs etc., loaded into the main memory. Therefore, it will be obvious to those skilled in the art that the functional blocks may be implemented in a variety of manners by hardware only, software only, or a combination of thereof.

Figure 2:
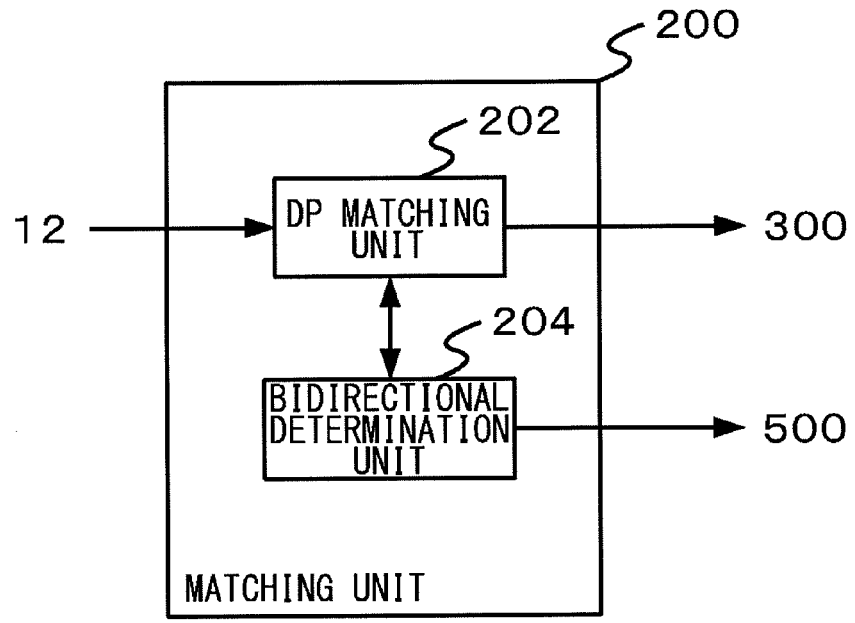
FIG. 2 schematically shows the internal configuration of the matching unit.

FIG. 2 schematically shows the internal configuration of the matching unit 200. The matching unit 200 includes a dynamic programming (DP) matching unit 202 and a bidirectional determination unit 204.

The DP matching unit 202 identifies areas in the parallax images that correspond to each other by computing DP matching scores between the parallax image for the left eye and the parallax image for the right eye, and determines the amount of displacement between the areas thus identified. For example, if a pixel corresponding to the pixel located at the coordinates (X, Y) in the parallax image for the left eye is located at the coordinates (X+α, Y) in the parallax image for the right eye, the DP matching unit 202 determines the amount of displacement as "+α pixels in the X direction".

The bidirectional determination unit 204 controls the DP matching unit 202 to determine the amount of displacement of the subject captured in the parallax image for the right eye with reference to the parallax image for the left eye. Subsequently, the bidirectional determination unit 204 controls the matching unit 202 to determine the amount of displacement of the subject captured in the parallax image for the left eye with reference to the parallax image for the right eye. The result of bidirectionally computing matching scores in subjects captured in the parallax images is output to the error determination unit 500 and is used to determine the reliability of matching.

Figure 3:
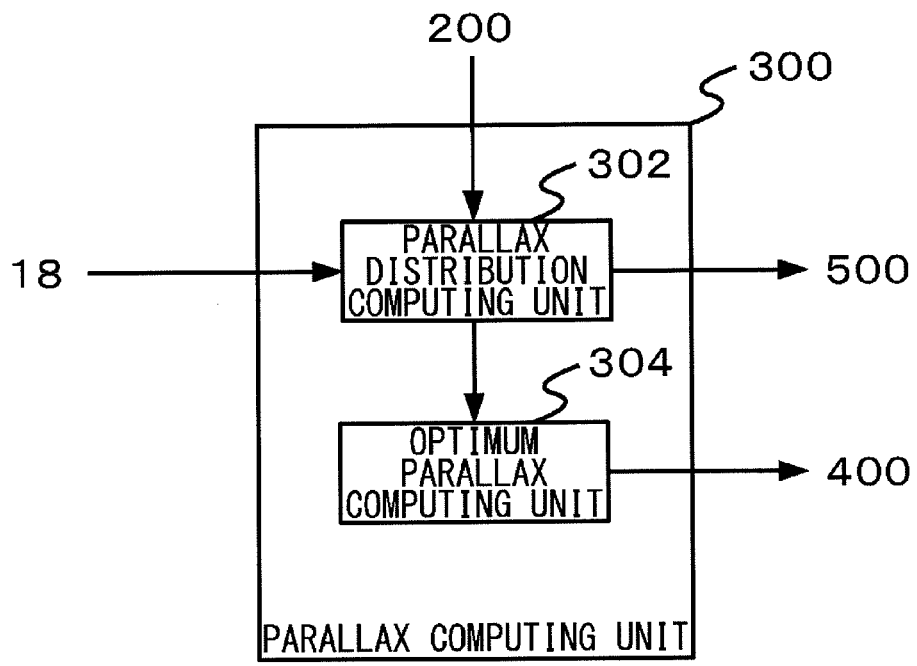
FIG. 3 schematically shows the internal configuration of the parallax computing unit.

FIG. 3 schematically shows the internal configuration of the parallax computing unit 300. The parallax computing unit 300 includes a parallax distribution computing unit 302 and a optimum parallax computing unit 304.

The parallax distribution computing unit 302 acquires information on matching between the parallax image for the left eye and the parallax image for the right eye from the DP matching unit 202 and computes the distribution of parallax in the images in accordance with the information. For example, in the case of parallax images that include a wall entirely painted with a primary color or an area in the sky imaged against the sun, such areas are imaged as a flat pattern quite similar to each other across the images. It will be difficult for the DP matching unit 202 to identify corresponding areas between parallax images that include such a flat pattern. As a result, the reliability of matching will be low in those image areas. In this respect, the parallax distribution computing unit 302 acquires the edge distribution in the images from the reliability determination unit 18 and computes the distribution of parallax in areas in the images that include edge components. By determining the distribution of parallax in image areas with high matching reliability, the reliability of distribution as determined is improved.

The optimum parallax computing unit 304 computes the amount of adjusting the parallax in the parallax image that should be displayed on the display device in accordance with the distribution of parallax acquired from the parallax distribution computing unit 302. Details of parallax adjustment and computation of the amount of adjustment will be given later.

Figure 4:
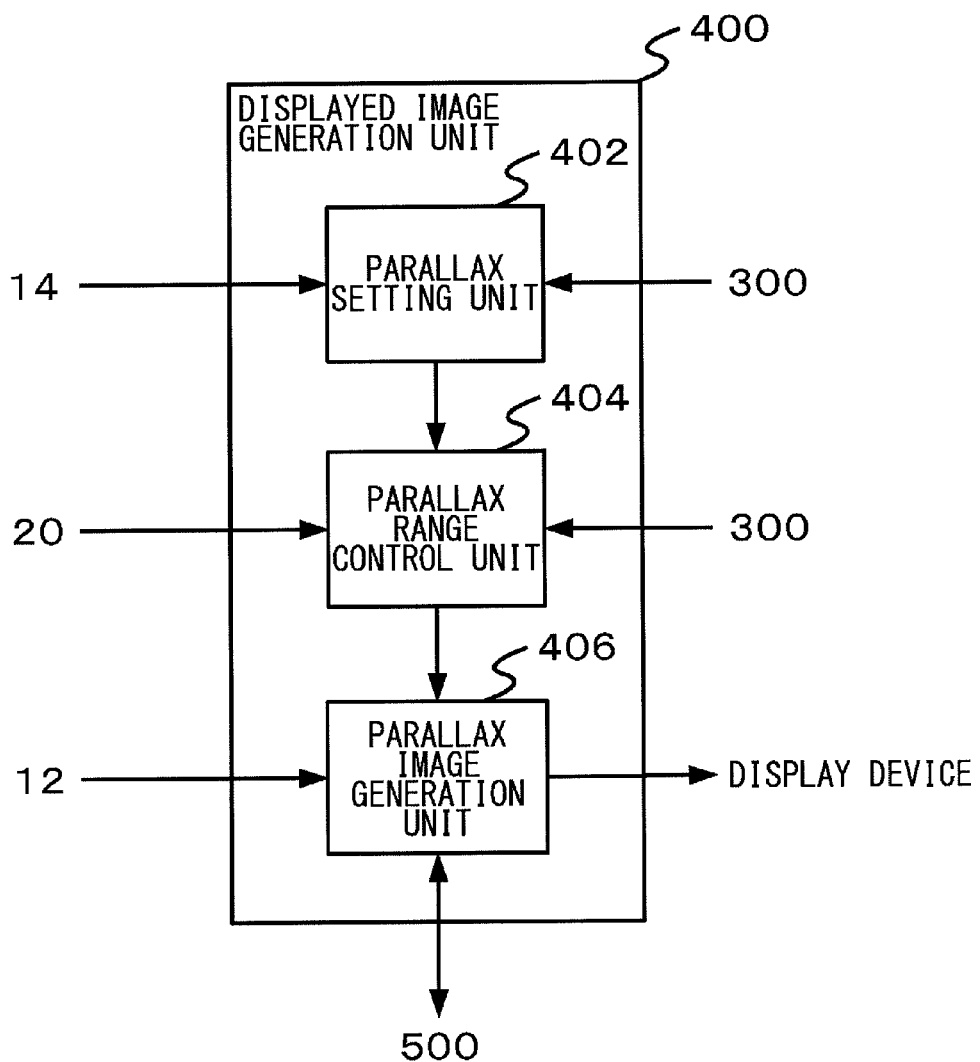
FIG. 4 schematically shows the internal configuration of the displayed image generation unit.

FIG. 4 schematically shows the internal configuration of the displayed image generation unit 400. The displayed image generation unit 400 includes a parallax setting unit 402, a parallax range control unit 404, and a parallax image generation unit 406.

The parallax setting unit 402 acquires the amount of adjusting the parallax in the parallax images that should be displayed on the display device from the optimum parallax computing unit 304 in the parallax computing unit 300. The parallax setting unit 402 also acquires the amount of adjusting the parallax in the parallax images that should be displayed on the display device from the user via the user request receiving unit 14. Whether priority should be given to the amount of adjusting the parallax acquired from the user or the amount of adjusting the parallax acquired from the optimum parallax computing unit 304 may be determined as desired depending on the situation in which the image processing device 100 is used.

The parallax range control unit 404 controls a range in which the parallax can be adjusted so that the range does not exceed the maximum parallax range, in accordance with the maximum parallax range acquired from the maximum parallax range acquisition unit 20 and the distribution of parallax in the parallax images acquired from the parallax distribution computing unit 302 in the parallax computing unit 300. If, as a result of complying with the user request for adjustment acquired from the user request receiving unit 14, the distribution of parallax in the parallax images extends beyond the maximum parallax range, the amount of adjustment is controlled within the maximum amount that does not extend beyond the maximum parallax range.

FIGS. 5A and 5B schematically shows an example of parallax distribution. The horizontal axis in FIGS. 5A and 5B denotes parallax and the vertical axis denotes the frequency thereof. Parallax is indicated in units of pixels, the number of pixels indicating the amount of displacement between parallax images. FIGS. 5A and 5B are frequency distribution charts showing the displacement, defined by the number of pixels, between the pixels forming a subject captured in the parallax image for the left eye and those forming the subject captured in the parallax image for the right eye, as determined by the DP matching unit 202. As described above, the user viewing an image area with the parallax of 0 pixels locates that image on the display device. Image areas with a non-zero parallax are located more toward the user than the display device, i.e., in front of the display device, or behind the displace device. The graphs of FIGS. 5A and 5B show that images with a positive parallax are located in front of the display device. The larger the absolute value of the parallax, the more remote from the display device the images are located.

FIG. 5A shows an example of parallax distribution in the original parallax image for the left eye and the original parallax image for the right eye as computed by the parallax distribution computing unit 302. The graph of FIG. 5A shows a distribution abundant in positive parallax. As the user views the stereoscopic images, the user locates much of the image portions in front of the display device.

FIG. 5B shows an example of parallax distribution subjected to parallax adjustment computed by the optimum parallax computing unit 304. In the example shown in FIG. 5B, adjustment is made such that many of the pixels are zero-parallax pixels and many of the images are located behind the display device. "Adjustment of parallax" signifies changing the position of zero parallax on the display device. "Amount of adjusting parallax" signifies the amount of relative displacement, defined by the number of pixels, effected between the parallax image for the left eye and the parallax image for the right eye in order to change the position of zero parallax on the display device.

The type of image desired to be produced by adjustment may be optional and predetermined through experiments. The optimum parallax computing unit 304 refers to the parallax distribution computed by the parallax distribution computing unit 302 and determines the amount of adjusting the parallax so that the parallax distribution approaches the desired distribution in the images. More specifically, the optimum parallax computing unit 304 evaluates the parallax distribution, using the sum of weighted frequencies as a score and determines the amount of adjusting the parallax that yields the maximum score.

Figure 6:
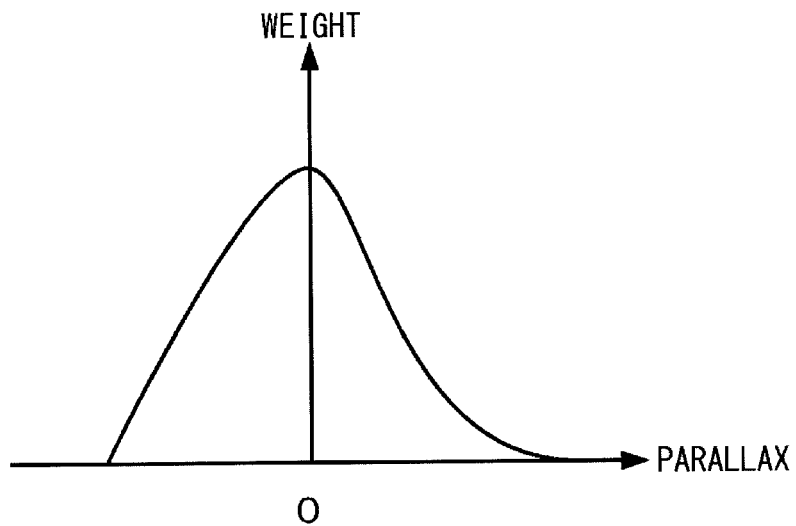
FIG. 6 schematically shows an example of weighting used to determine the amount of adjusting the parallax.

FIG. 6 schematically shows an example of weighting used to determine the amount of adjusting the parallax. By way of example, weighting shown in FIG. 6 is used to determine the amount of adjustment such that many of the pixels are zero-parallax pixels and many of the images are located behind the display device, as shown in FIG. 5B. As shown in FIG. 6, the larger the absolute value of the parallax, the smaller the weight, and the weight is decreased more abruptly with increasing absolute values of the parallax in the positive parallax zone than in the negative parallax zone. By multiplying the frequency with the weights as shown and computing the sum of frequencies as a score results in higher scores when a large number of pixels are located in the neighborhood of zero parallax and a large number of images are located behind the display device. By evaluating the score while changing the amount of adjustment and employing the amount of adjustment that yields a high score, desired parallax images are obtained. Thus, once target images are defined, the amount of adjustment can be determined by computation by designing the weighting such that the score for the parallax distribution in images like the target images is high.

Referring to FIG. 4, the parallax image generation unit 406 generates parallax images adjusted according to the amount of adjusting the parallax acquired by the parallax setting unit 402, within a range controlled by the parallax range control unit 404. When the enlarging and reducing unit 12 enlarges parallax images according to a user request, the parallax between the parallax images is also enlarged in proportion to the requested magnification factor. To address this, the parallax range control unit 404 controls the amount of adjusting the parallax, i.e., amount of displacement between the parallax images, so that the parallax distribution in the parallax image for the left eye and the parallax image for the right eye as enlarged by the enlarging and reducing unit 12 does not exceed the maximum parallax range. More specifically, the unit 404 controls the amount of adjustment to reduce the parallax enlarged in accordance with the enlargement of the images.

Figure 7:
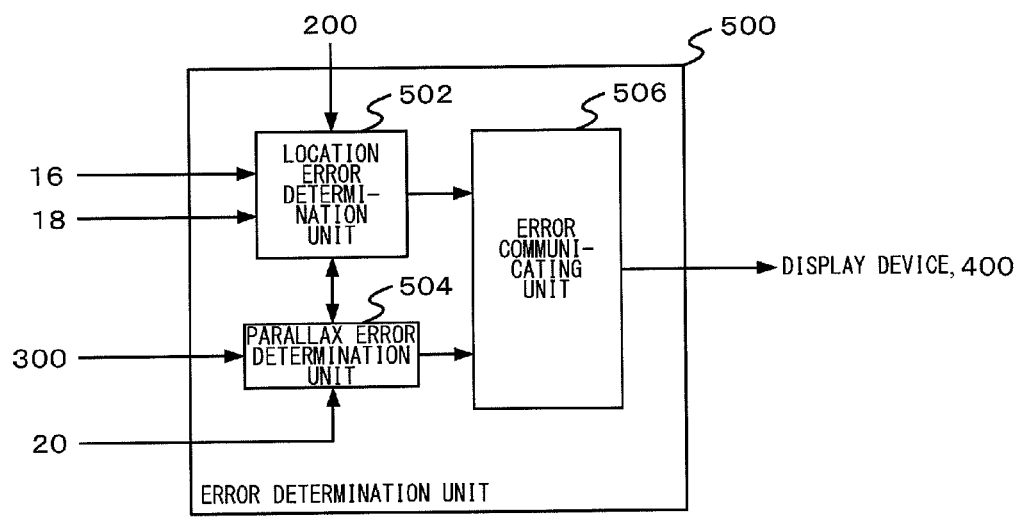
FIG. 7 schematically shows the internal configuration of the error determination unit.

FIG. 7 schematically shows the internal configuration of the error determination unit 500. The error determination unit 500 includes a location error determination unit 502, a parallax error determination unit 504, and an error communication unit 506.

The error determination unit 502 determines whether the parallax image for the left eye and the parallax image for the right eye acquired from the enlarging and reducing unit 12 are stereoscopic images that can be located as three-dimensional images. More specifically, the location error determination unit 502 performs three types of determination described below.

First, the location error determination unit 502 determines whether the images are stereoscopic images that can be located as three-dimensional images, by referring to the reliability of matching between the parallax image for the left eye and the parallax image for the right eye acquired from the reliability determination unit 18. More specifically, when either or both of the matching reliability of the parallax image for the left eye and the matching reliability of the parallax image for the right eye is of a predetermined level or lower, the error determination unit 502 determines that the images cannot be located as three-dimensional images. The criterion relied upon to determine a location error based on matching reliability may be determined through experiments by collecting sample images. Using location error based on matching reliability, a determination on the suitability of stereoscopic images can be made only by referring to the characteristics of a single image and without relying on the relation between parallax images. Even when a parallax image for the left eye and a parallax image for the right eye are used, determination on suitability is made using the characteristics confined to individual parallax images independently.

Second, the location error determination unit 502 refers to the luminance distribution in the parallax image for the left eye and the luminance distribution in the parallax image for the right eye acquired from the luminance acquisition unit 16 so as to determine whether the images are stereoscopic images that can be located as three-dimensional images. More specifically, when the difference between the distribution of luminance values in the parallax image for the left eye and the distribution of luminance values in the parallax image for the right eye is of a predetermined level or more, a determination is made that the images cannot be located as three-dimensional images. This is because, if the images are views of the same subject from different angles, the images will have similar luminance distribution. The criterion relied upon to determine a location error based on luminance distribution may be determined through experiments by collecting sample images.

Third, the location error determination unit 502 refers to the result of bidirectional computation of matching scores of subjects as captured in the parallax images acquired from the bidirectional determination unit 204 in the matching unit 200 so as to determine whether the images are stereoscopic images that can be located as three-dimensional images. More specifically, when i) the sum of the absolute values of the amount of displacement of the parallax image for the right eye with reference to the parallax image for the left eye and ii) the sum of the amount of displacement in the opposite direction differ by a predetermined level or more, a determination is made that the images cannot be located as three-dimensional images. This is because, if matching is properly established between images that are views of the same subject from different angles, the computed results should be similar whichever of the parallax images is used as the reference to compute the amount of displacement. The criterion relied upon to determine a location error based on the results of bidirectional determination by the bidirectional determination unit 204 may be determined through experiments by collecting sample images.

The three types of determination all determine whether the parallax image for the left eye and the parallax image for the right eye are stereoscopic images that can be located as three-dimensional images. When correspondence cannot be found between subjects as captured in both parallax images, the location error determination unit 502 outputs the fact to the error communication unit 506.

The parallax error determination unit 504 determines whether the distribution of parallax induced by the subjects as captured in the parallax images generated by the parallax image generation unit 406 in the displayed image generation unit 400 is accommodated within the maximum parallax range. More specifically, the parallax error determination unit 504 acquires the maximum parallax range from the maximum parallax range acquisition unit 20, the parallax distribution in the parallax images from the parallax distribution computing unit 302 in the parallax computing unit 300, the amount of adjusting the parallax from the parallax image generation unit 406, so as to determine whether the parallax distribution subjected to parallax adjustment is out of the maximum parallax range.

The error communication unit 506 acquires the determination as to whether the parallax images can be located as three-dimensional stereoscopic images from the location error determination unit 502 and acquires the determination as to whether the distribution of parallax induced by the subjects as captured in the parallax images generated by the parallax image generation unit 406 is accommodated within the maximum parallax range from the parallax error determination unit 504. The error communication unit 506 integrates the acquired results. Upon acquisition of at least one of the determination that the images cannot be located as stereoscopic images and the determination that the distribution of parallax induced by the subject is not accommodated within the maximum parallax range, the error communication unit 506 outputs the fact to the display device and notifies the user accordingly. By determining whether the stereoscopic images can be located as three-dimensional images prior to displaying the images on the display device, determining whether the parallax distribution is suitable, and letting user know the result, the user can know what kind of image is displayed.

Figure 8B:
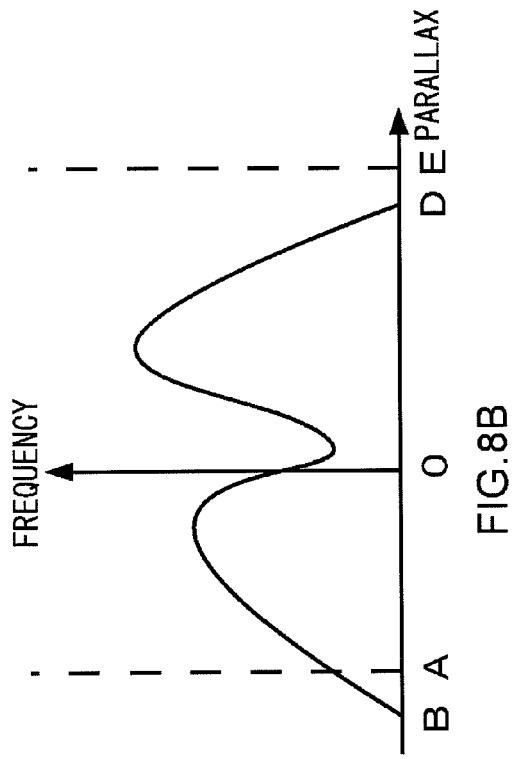
FIGS. 8A and 8B schematically show an example of the relation between the parallax distribution and the maximum parallax range.
Figure 8A:
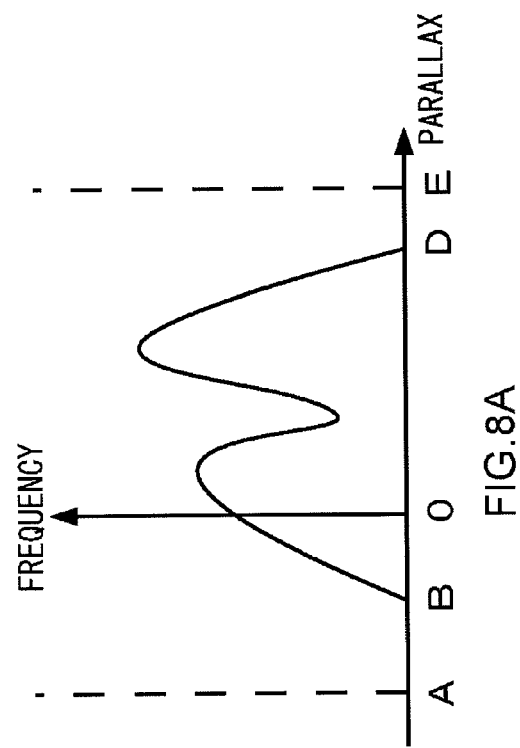

FIGS. 8A and 8B schematically show an example of the relation between the parallax distribution and the maximum parallax range. Referring to the graphs of FIGS. 8A and 8B, the area bounded by the broken line passing through point A on the horizontal axis and the broken line passing through point B represents the maximum parallax range. In the example shown in FIG. 8A, the parallax distribution in the parallax images is accommodated within the maximum parallax range. More specifically, the parallax distribution of the parallax images is such that the minimum value B of the parallax is larger than the minimum value A of the maximum parallax range and the maximum value C of the parallax is smaller than the maximum value D of the maximum parallax range. In such a case, the parallax error determination unit 504 determines that the parallax distribution in the parallax images is accommodated within the maximum parallax range.

FIG. 8B shows another example of the relation between the parallax distribution and the maximum parallax range. In the example shown in FIG. 8B, the minimum value B in the parallax distribution in the parallax images is smaller than the minimum value A of the maximum parallax range. In such a case, the parallax error determination 504 determines that the parallax distribution in the parallax images is out of the maximum parallax range.

In the example shown in FIG. 8A, the difference between the minimum value A of the maximum parallax range and the minimum value B of the parallax, and the difference between the maximum value C of the parallax and the maximum value D of the maximum parallax range represent ranges of parallax in which adjustment can be made as determined by the parallax range control unit 404.

When the parallax error determination unit 504 determines that the parallax distribution in the parallax images is accommodated within the maximum parallax range, the parallax image generation unit 406 in the displayed image generation unit 400 generates parallax images for display. When the location error determination unit 502 determines that the parallax image for the left eye and the parallax image for the right eye are not stereoscopic images that can be located as a three-dimensional images, the parallax image generation unit 406 generates one of the parallax image for the left eye and the parallax image for the right eye as an image for display. The images may not be displayed as stereoscopic images located three-dimensionally. However, the user can view one of the parallax images as displayed.

When the parallax error determination unit 504 determines that the parallax distribution in the parallax images is out of the maximum parallax range, the parallax image generation unit 406 generates parallax images for display by processing the image area having parallax out of the maximum parallax range and the image area within the maximum parallax range using different methods of processing. More specifically, the unit 406 may increase the luminance value of the image area having parallax out of the maximum parallax range or adjust the color tone so as to, for example, redden the image area. This helps the user to trim the image area within the maximum parallax range and generate images suitably viewed as three-dimensional images.

Figure 9:
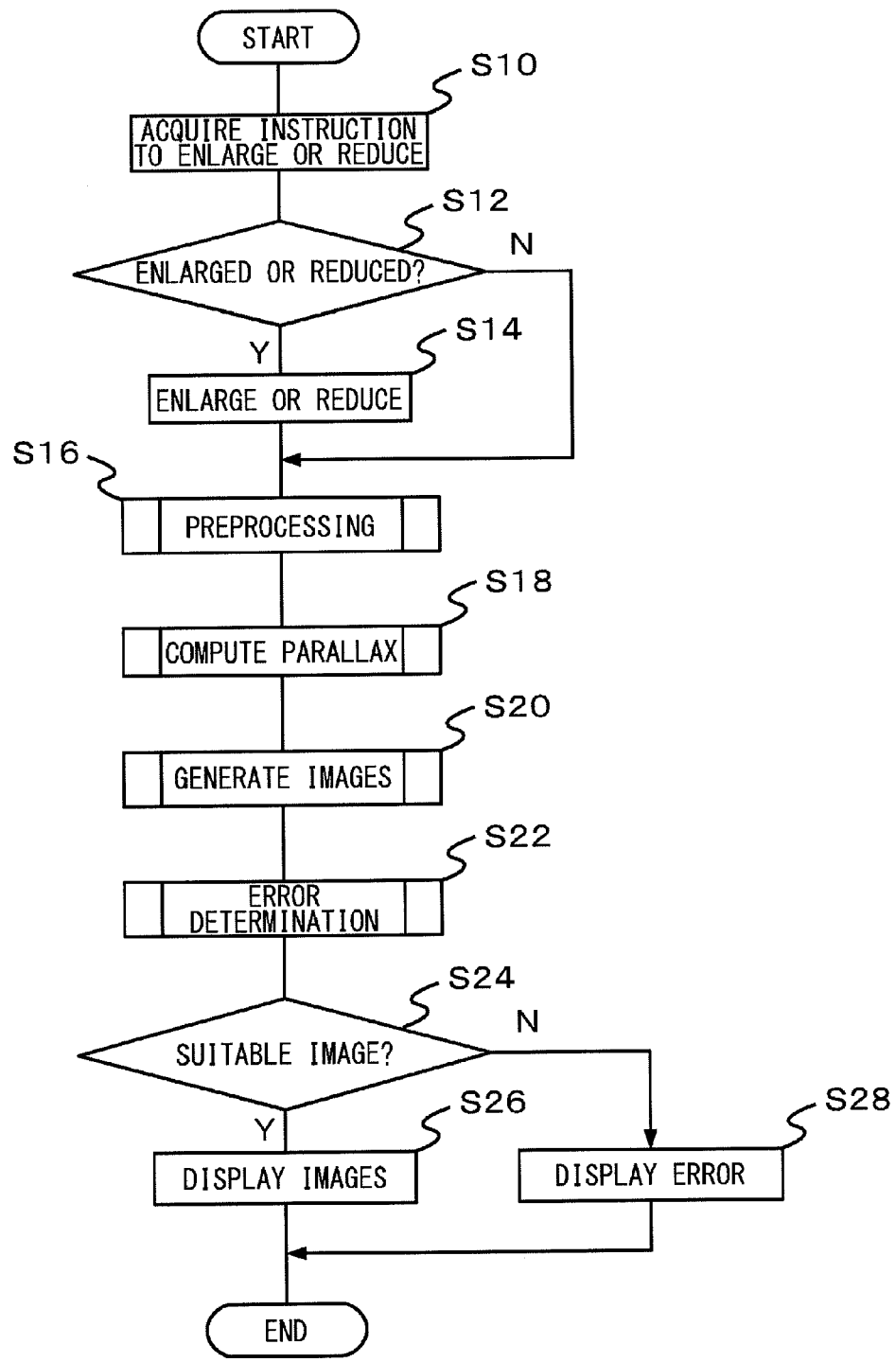
FIG. 9 is a flowchart showing the flow of the process in the image processing device according to the embodiment.

FIG. 9 is a flowchart showing the steps performed in the components of the image processing device 100 according to the embodiment. Referring to the flowchart, the steps in the respective components are denoted by a combination of S (initial letter of Step), which indicates "step", and a numeral. When a determination is performed in a step denoted by a combination of S and a numeral and when the result of determination is affirmative, Y (initial letter of Yes) is used to indicate the affirmative determination (e.g., Y in S12). Conversely, when the result of determination is negative, N (initial letter of No) is used to indicate the negative determination (e.g., N in S12). The steps in the flowchart are started when the image processing device 100 is started.

The user request receiving unit 14 acquires a request form the user indicating whether to enlarge or reduce the image for display (S10). When the unit 14 acquires a request from the user indicating that the image should be enlarged or reduced (Y in S12), the enlarging and reducing unit 12 enlarges or reduces the parallax images for the left eye and the right eye acquired from the image data storage 10 (S14). When the unit 14 does not acquire a request from the user indicating that the image should be enlarged or reduced (N in S12), the enlarging and reducing unit 12 only acquires the image from the image data storage 10 and does not enlarge or reduce the images.

The reliability determination unit 18 and the matching unit 200 acquire parallax images from the enlarging and reducing unit 12 and performs preprocessing to compute parallax (S16). The parallax computing unit 300 computes the parallax distribution in the parallax images acquired from the enlarging and reducing unit 12 in accordance with the result of preprocessing in S16 (S18). The displayed image generation unit 400 adjusts the parallax in the parallax images acquired from the enlarging and reducing unit 12 and then generates parallax images for display (S20). The error determination unit 500 refers to the result of determination on the luminance of the parallax images acquired from the luminance acquisition unit 16, the result of preprocessing in S16, the parallax distribution computed by the parallax computing unit 300, the amount of adjusting the parallax acquired from the displayed image generation unit 400, and the maximum parallax range acquired from the maximum parallax range acquisition unit 20 so as to determine whether the parallax images are reliable as three-dimensional images (S22).

When the parallax images are determined as being proper stereoscopic images that can be located as three-dimensional images as a result of determination on the reliability by the error determination unit 500 (Y in S24), the displayed image generation unit 400 displays the images on the display device (S26). When it is determined as a result of determination on the reliability by the error determination unit 500 that the images cannot be located as three-dimensional images or that the images can be located but characterized by large parallax (N in S24), the error determination unit 500 displays an error message indicating the fact on the display device (S28). When the displayed image generation unit 400 displays the images or the error determination unit 500 displays an error message, the process of the flowchart is terminated.

Figure 10:
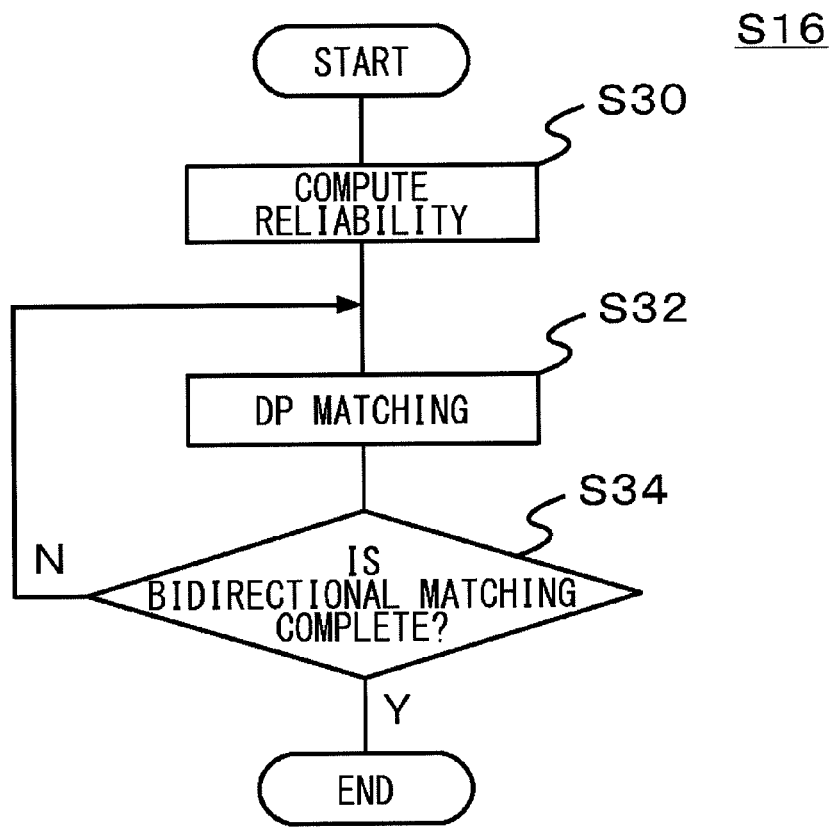
FIG. 10 is a flowchart showing the flow of the process in the matching unit.

FIG. 10 is a flowchart showing the flow of the process in the matching unit 200 and shows the detail of step S16 in FIG. 9.

The reliability determination unit 18 acquires the parallax image for the left eye and the parallax image for the right eye and computes the "reliability of matching" between the images (S30). The DP matching unit 202 determines correspondence between subjects included in both images by computing a DP matching score between the parallax image for the left eye and the parallax image for the right eye and determines the amount of displacement (S32).

The bidirectional determination unit 204 verifies whether the DP matching unit 202 has determined the correspondence in both directions by determining the matching score of the parallax image for the right eye with reference to the parallax image for the left eye and determining the matching score of the parallax image for the left eye with reference to the parallax image for the right eye. When the acquisition of correspondence by bidirectional matching is not completed (N in S34), the bidirectional determination unit 204 causes the DP matching unit 202 to compute the matching score. When the acquisition of correspondence by bidirectional matching is completed (Y in S34), the process is terminated.

Figure 11:
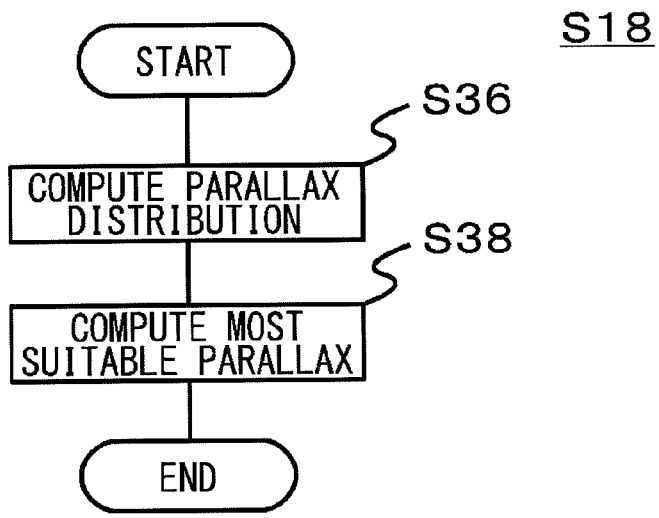
FIG. 11 shows the flow of the process in the parallax computing unit.

FIG. 11 shows the flow of the process in the parallax computing unit 300 and shows the detail of step S18 in FIG. 9.

The parallax distribution computing unit 302 acquires the reliability of matching between parallax images from the reliability determination unit 18 and computes the distribution of parallax in a region in the images with high matching reliability by referring to the information on matching between the parallax image for the left eye and the parallax image for the right eye acquired from the DP matching unit 202 (S36). The optimum parallax computing unit 304 computes the amount of adjusting the parallax in the parallax images displayed on the display device in accordance with the parallax distribution acquired from the parallax distribution computing unit 302 (S38). When the optimum parallax computing unit 304 has computed the amount of adjusting the parallax in the parallax images, the process is terminated.

Figure 12:
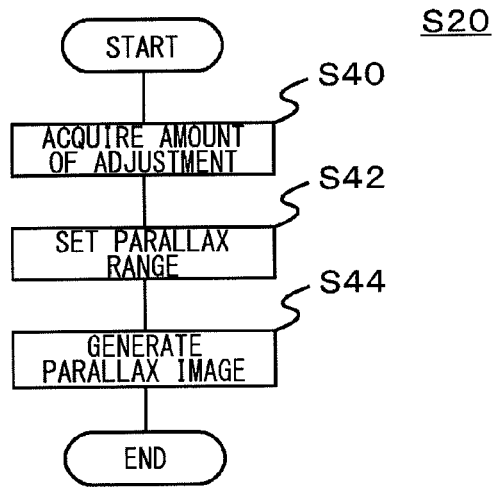
FIG. 12 is a flowchart showing the flow of the process in the displayed image generation unit.

FIG. 12 is a flowchart showing the flow of the process in the displayed image generation unit 400 and shows the detail of step S20 in FIG. 9.

The parallax setting unit 402 acquires the amount of adjusting the parallax from the user via the user request receiving unit 14 and from the optimum parallax computing unit 304 (S40). The parallax range control unit 404 sets a range of parallax such that the range does not exceed the maximum parallax range, in accordance with the maximum parallax range acquired from the maximum parallax range acquisition unit 20 and the distribution of parallax in the parallax images acquired from the parallax distribution computing unit 302 in the parallax computing unit 300. the parallax image generation unit 406 generates parallax images adjusted according to the amount of adjusting the parallax acquired by the parallax setting unit 402 within a range controlled by the parallax range control unit 404. When the parallax image generation unit 406 has generated the parallax image, the process is terminated.

Figure 13:
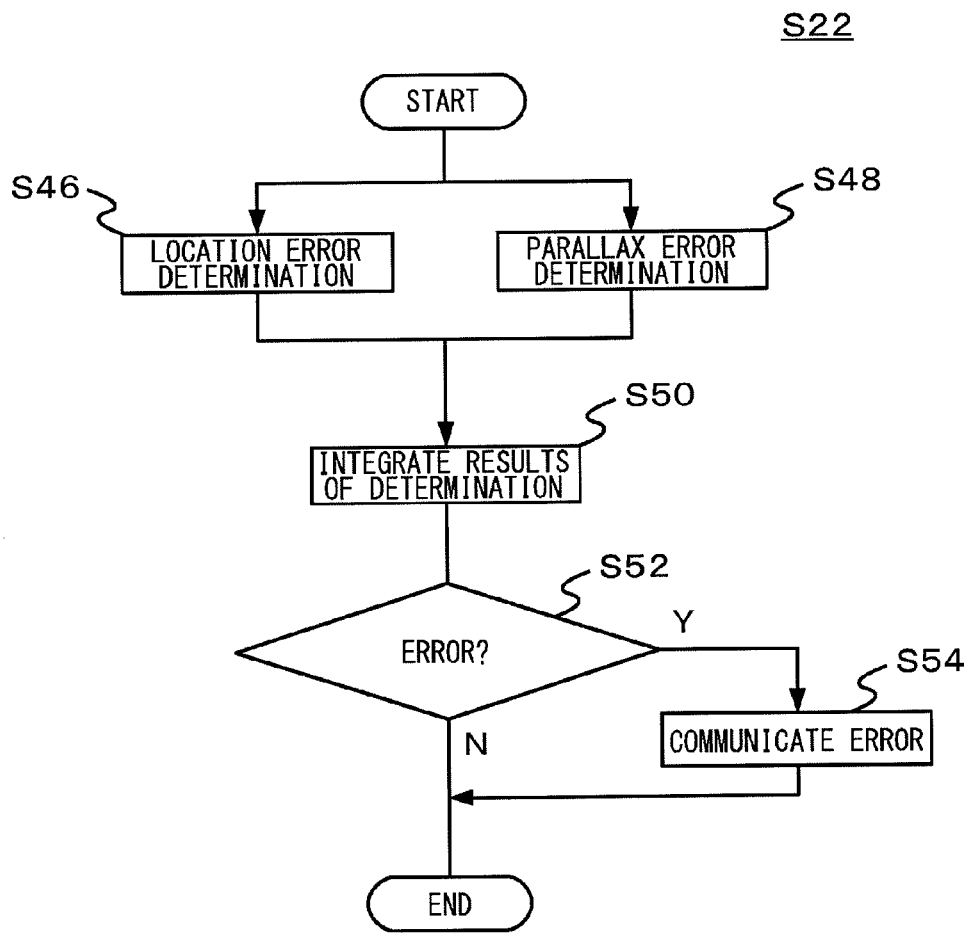
FIG. 13 is a flowchart showing the flow of the process in the error determination unit.

FIG. 13 is a flowchart showing the flow of the process in the error determination unit 500 and shows the detail of step S22 in FIG. 9.

In parallel with the determination by the location error determination unit 502 as to whether the parallax image for the left eye and the parallax image for the right eye acquired from the enlarging and reducing unit 12 are stereoscopic images that can be located as three-dimensional images (S46), the parallax error determination unit 504 determines whether an error occurs in respect of parallax by identifying whether the parallax distribution between parallax images generated by the parallax image generation unit 406 in the displayed image generation unit 400 is accommodated within the maximum parallax range (S48). The error communication unit 506 integrates the results of determination by the location error determination unit 502 and the parallax error determination unit 504 (S50). When one of the two errors is identified, i.e., when the parallax images cannot be located as three-dimensional images or when the parallax distribution is not accommodated within the maximum parallax range (Y in S52), the error communication unit 506 notifies the user by displaying a message indicating as such on the display device (S54). When neither of the errors is identified (N in S52) or when the error communication unit 506 communicated an error, the process is terminated.

The operation according to the configuration described above is as follows. When the user starts the image processing device 100 according to the embodiment and attempts to display stereoscopic images including the parallax image for the left eye and the parallax image for the right eye on the display device, the error determination unit 500 determines whether the stereoscopic images can be suitably viewed by the user. When it is determined that the stereoscopic images cannot be suitably viewed by the user, the display device displays the fact. When the range of parallax between parallax images is too extensive, the image area causing the extensiveness is specifically presented to the user.

As described above, the embodiment provides a technology of reducing user load associated with viewing stereoscopic images.

Given above is a description of the embodiment. The embodiment is intended to be illustrative only and it will be obvious to those skilled in the art that various modifications to constituting elements and processes could be developed and that such modifications are also within the scope of the present invention.

In the above, a description is given of a case where the parallax setting unit 402 in the displayed image generation unit 400 acquires the amount of adjusting the parallax in the parallax images displayed on the display device from the user via the user request receiving unit 14. Alternatively, the user may designate an arbitrary position in the image via the user request receiving unit 14. The parallax image generation unit 406 makes adjustment so that the subject captured at the position designated by the user is located near the display device and generates parallax images for display accordingly.

More specifically, the adjustment may be such that the parallax at the position designated by the user is 0. This provides a more intuitive user interface for parallax adjustment in comparison with the case where the amount of adjustment is input.

In the above description, the DP matching unit 202 in the matching unit 200 computes a DP matching score between the parallax image for the left eye and the parallax image for the right eye and examines the correspondence between the images. Alternatively, techniques other than DP matching may be used to examine the correspondence. For example, known matching techniques such as template matching may be used.

In the above description, a description is given of a case where the location error determination unit 502 and the parallax error determination unit 504 perform the operation in parallel. Alternatively, the parallax error determination 504 may be used when the location error determination unit 502 determines that the images are not stereoscopic images that can be located as three-dimensional images. This is because it is often not necessary to identify parallax in a pair of images that cannot be located as three-dimensional images. The variation is advantageous in that the computing cost incurred to determine the parallax error is curtailed.

What is claimed is:

1. An image processing device comprising:
   a location error determination unit configured to determine, prior to displaying on a display device stereoscopic images including a parallax image for the left eye and a parallax image for the right eye of a subject, using luminance distribution and bidirectional computation whether the parallax image for the left eye and the parallax image for the right eye are stereoscopic images that can be located as three-dimensional images;
   a parallax error determination unit configured to determine a reliability of matching, when it is determined that the parallax image for the left eye and the parallax image for the right eye can be located as stereoscopic images, whether a range of distribution of parallax between the parallax images for the left eye and the parallax image for the right eye is accommodated within a predetermined parallax range;
   an error communicating unit configured to communicate an error when it is determined that the parallax image for the left eye and the parallax image for the right eye cannot be located as stereoscopic images or when it is determined that the range of parallax between the parallax image for the left eye and the parallax image for the right eye is not accommodated within the predetermined parallax range; and
   a reliability determination unit configured to refer to a feature determined by characteristics confined to the parallax image for the left eye and the parallax image for the right eye and not depending on a relation between the parallax image for the left eye and the parallax image for the right eye, so as to identify an area in which a reliability of matching between the parallax image for the left eye and the parallax image for the right eye is established,
   wherein the reliability of matching is in indicator indicating a sharpness of image edges between the parallax image for the left eye and the parallax image for the right eye, and
   wherein the location error determination unit determines that the parallax image for the left eye and the parallax image for the right eye are not stereoscopic images that can be located as three-dimensional images when a ratio occupied by an area in which the reliability of matching between the parallax image for the left eye and the parallax image for the right eye is established with respect to the entirety of the parallax image for the left eye and the parallax image for the right eye is a predetermined ratio or lower.

2. The image processing device according to claim 1, further comprising:
   a matching unit configured to identify areas in the parallax image for the left eye and the parallax image for the right eye that correspond to each other;
   a parallax distribution computing unit configured to compute the distribution of parallax in areas that are included in the areas in the parallax image for the left eye and the parallax image for the right eye corresponding to each other as determined by the matching unit and areas in which the reliability of matching is established; and
   a displayed image generation unit configured to generate parallax images for display by adjusting the parallax in accordance with the parallax distribution computed by the parallax distribution computing unit.

3. The image processing device according to claim 1, further comprising: a displayed image generation unit configured to generate, when it is determined that the parallax image for the left eye and the parallax image for the right eye are not stereoscopic images that can be located as three-dimensional images, generate the parallax image for the left eye or the parallax image for the right eye as an image for display.

4. An image processing method comprising:
   using a hardware processor to determine, prior to displaying on a display device stereoscopic images including a parallax image for the left eye and a parallax image for the right eye of a subject, using luminance distribution and bidirectional computation whether the parallax image for the left eye and the parallax image for the right eye are stereoscopic images that can be located as three-dimensional images;
   using the processor to determine, when it is determined that the parallax image for the left eye and the parallax image for the right eye can be located as stereoscopic images, whether a range of distribution of parallax between the parallax image for the left eye and the parallax image for the right eye is accommodated within a predetermined parallax range;
   using the processor to communicate an error when it is determined that that the parallax image for the left eye and the parallax image for the right eye cannot be located as stereoscopic images or when it is determined that the range of parallax between the parallax image for the left eye and the parallax image for the right eye is not accommodated within the predetermined parallax range; and
   using the processer to refer to a feature determined by characteristics confined to the parallax image for the left eye and the parallax image for the right eye and not depending on a relation between the parallax image for the left eye and the parallax image for the right eye, so as to identify an area in which a reliability of matching between the parallax image for the left eye and the parallax image for the right eye is established,
   wherein the reliability of matching is in indicator indicating a sharpness of image edges between the parallax image for the left eye and the parallax image for the right eye, and
   wherein, it is determined that the parallax image for the left eye and the parallax image for the right eye are not stereoscopic images that can be located as three-dimensional images when a ratio occupied by an area in which the reliability of matching between the parallax image for the left eye and the parallax image for the right eye is established with respect to the entirety of the parallax image for the left eye and the parallax image for the right eye is a predetermined ratio or lower.

5. A program embedded in a non-transitory computer readable recording medium, the program comprising:
   a module configured to determine, prior to displaying on a display device stereoscopic images including a parallax image for the left eye and a parallax image for the right eye of a subject, using luminance distribution and bidirectional computation whether the parallax image for the left eye and the parallax image for the right eye are stereoscopic images that can be located as three-dimensional images;
   a module configured to determine, when it is determined that the parallax image for the left eye and the parallax image for the right eye can be located as stereoscopic images, whether a range of distribution of parallax between the parallax image for the left eye and the parallax image for the right eye is accommodated within a predetermined parallax range; and
   a module configured to communicate an error when it is determined that that the parallax image for the left eye and the parallax image for the right eye cannot be located as stereoscopic images or when it is determined that the range of parallax between the parallax image for the left eye and the parallax image for the right eye is not accommodated within the predetermined parallax range; and
   a module configured to refer to a feature determined by characteristics confined to the parallax image for the left eye and the parallax image for the right eye and not depending on a relation between the parallax image for the left eye and the parallax image for the right eye, so as to identify an area in which a reliability of matching between the parallax image for the left eye and the parallax image for the right eye is established,
   wherein the reliability of matching is in indicator indicating a sharpness of image edges between the parallax image for the left eye and the parallax image for the right eye, and
   wherein the module configured to whether the parallax image for the left eye and the parallax image for the right eye are stereoscopic images that can be located as three-dimensional images determines that the parallax image for the left eye and the parallax image for the right eye are not stereoscopic images that can be located as three-dimensional images when a ratio occupied by an area in which the reliability of matching between the parallax image for the left eye and the parallax image for the right eye is established with respect to the entirety of the parallax image for the left eye and the parallax image for the right eye is a predetermined ratio or lower.

* * * * *